United States Patent Office 3,153,061
Patented Oct. 13, 1964

3,153,061
17-SUBSTITUTED 2,5-PREGNADIENE
DERIVATIVES
Percy L. Julian, Oak Park, Elizabeth Huang, Chicago, and Arthur Magnani, Wilmette, Ill., assignors, by mesne assignments, to Smith Kline & French Laboratories, Philadelphia, Pa., a corporation of Pennsylvania
No Drawing. Filed May 1, 1962, Ser. No. 191,416
14 Claims. (Cl. 260—397.3)

This invention relates to novel 2,5-pregnadiene compounds having 17-substituents which were not readily available previously. These compounds have interesting steroidal activity particularly in the progestational area. This invention also relates to novel processes for preparing these compounds.

4-keto-2,5-pregnadiene derivatives are described in our Pat. No. 2,891,975. These compounds were prepared by 2,6-dibromination followed by rearrangement with sodium acetate. The progesterone congeners, i.e., those having a 17-acetyl group, were described in this patent as being prepared only indirectly (because of the ease of bromination of the 21 position) such as by alkali reduction at 20, bromination, rearrangement and oxidation at 20.

We have also found that the 17α-hydroxy congeners also are readily brominated at 21. These compounds during the last oxidation step above also are readily split at the 17,20-diol bond. Also the 17α-acetoxy group is hydrolyzed during the alkaline reduction. The 17-substituted compounds and their preparation therefore posed a definite problem in the prior art.

Unexpectedly we have now found that when a 17α-acyloxy group such as acetoxy or a 17α-loweralkyl group such as methyl is present on the steroid ring, the preparation of these congeners by 2,6-bromination and rearrangement can proceed without the difficulties mentioned above. Undoubtedly this is due to the deactivation of the 17-acetyl moiety by the bulkiness of the moiety at 17.

The reactions using bulky groups at 17 and the products of these reactions having enhanced progestational activity are the subject of this invention. No 4-keto-2,5-pregnadiene has been described previously as having progestational activity.

Exemplary of the progestational compounds of this invention having enhanced activity are those of the formula:

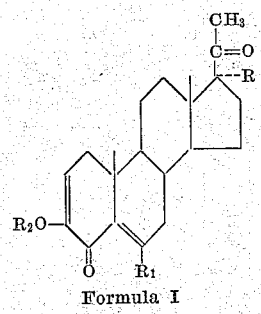

Formula I in which:
R is methyl or preferably acetoxy;
$R_1$ is methyl or hydrogen; and
$R_2$ is hydrogen or acyl derived from a nontoxic, stable and pharmaceutically acceptable carboxylic acid of less than 8 carbon atoms.

The compounds of Formula I can optionally have other substituents at various positions other than those directly involved in the reactions discussed such as at 9, 11 or 12. The 9α-fluoro, 11- or 12-hydroxy or keto congeners can be prepared by methods obvious to one skilled in the art. The important, progestationally active $\Delta^{11,12}$ congeners of Formula I are prepared by 2,6-bromination of the 11,12-dibromoprogesterone, selective removal of the adjacent bromine atoms with sodium iodide in acetone to give the $\Delta^{11,12}$ congener then reaction of this compound with sodium acetate/acetone as described.

The compounds of this invention are prepared from the known progesterone compounds by bromination with approximately two molar equivalents of bromine, preferably in the presence of hydrogen bromide, in an unreactive organic solvent in which the reactants are substantially soluble such as acetic acid, ether, chloroform, benzene, methylene chloride and the like or mixtures thereof. The reaction is usually carried out at from about 0° C. to about room temperature.

The reaction mixture is worked up by quenching in water and evaporating an organic extract thereof. The crude 2,6-dibromoprogesterone may be purified or not as desired for the subsequent rearrangement.

The dibromo intermediate is reacted with an alkali metal carboxylate, preferably in excess, at from about 25° C. to about 120° C. The reflux temperature of the reaction mixture is most practical for optimal yields. The reaction time may vary from 1 to 48 hours in various yields however at reflux temperature overnight gives generally satisfactory results.

The solvent for the reaction may be chosen from low boiling alcohols, ketones, chlorinated hydrocarbons or mixtures thereof. Exemplary of the solvents used are those boiling below about 120° C., such as acetone, methyl ethyl ketone, methanol, propanol, isobutanol, isopropanol, butanol, methylene chloride or mixtures thereof. Preferred are acetone, methyl ethyl ketone and anhydrous ethanol.

The alkali metal carboxylate is preferably the sodium or potassium salt. Any convenient carboxylic acid salt may be used such as alkanoates of less than 8 carbons, the benzoate, hexahydrobenzoate, etc. Usually the preferred salt is one having the same anion as the desired $R_2$. Reaction conditions other than those described have been found to give little practical advantage.

The compounds in which $R_2$ is hydrogen are prepared by hydrolysis of the esters with one molar equivalent of sodium methoxide in methanol at room temperature.

The compounds of Formula I in addition to being active progestational compounds are useful as intermediates in preparing other medicinally active progestational agents such as the 4,20-diketo-6-methyl(or hydrogen)-17α-methyl (or acetoxy) pregnanes by catalytic reduction.

Other variations of the processes and compounds of this invention will be apparent to those skilled in the art. The following examples will however illustrate the invention fully.

Example 1

A solution of 60 g. of 17α-acetoxyprogesterone in 1200 ml. of ethyl ether and 180 ml. of acetic acid is stirred and cooled to 10° C. After adding 24 ml. of 17% hydrogen bromide solution in acetic acid, a solution of 60 g. of bromine in 60 ml. of glacial acetic acid is added dropwise over 20 minutes at 5–10° C. The solution is stirred briefly at room temperature. Water is added. The ethereal layer is separated, washed and evaporated to give 2α,6β-dibromo-17α-acetoxyprogesterone.

The crude dibromo residue is stirred and heated at reflux overnight in a mixture of 300 g. of potassium acetate and 600 ml. of acetone. The acetone is distilled off; water added and the product extracted with methylene chloride. After working up the extract the crude product is recrystallized from methanol to give 2,5-pregnadien-3,17α-diol-4,20-dione,3,17-diacetate; M.P. 238–242° C., $[\alpha]_{CHCl_3}$ 2–20; E max.=4000 at 248 mμ (methanol).

Example 2

A solution of 20.7 g. of bromine in 23 ml. of glacial acetic acid is added as above to a mixture of 23 g. of 17a-acetoxy-6α-methylprogesterone, 460 ml. of ether, 70 ml. of acetic acid and 9 ml. of 17% hydrogen bromide/acetic acid solution. The crystalline dibromide separates partially. Water is added followed by sufficient methylene chloride to dissolve the dibromide. The extract is worked up to give the difficultly soluble dibromide, M.P. 115–118° (dec.).

This compound is reacted with 110 g. of potassium acetate and 260 ml. of acetone at reflux overnight. After working up as described above and recrystallization from acetone-hexane, 6-methyl-2,5-pregnadiene-3,17α-diol-4,20-dione 3,17-diacetate is obtained; M.P. 145–148° C., $[\alpha]_{CHCl_3}=-20$; E max. 600 at 244 mμ and 5000 at 286 mμ.

Example 3

A solution of 11.3 g. of bromine in 10 ml. of acetic acid is added at 10–12° C. in 5 minutes to a solution of 10 g. of 17α-methylprogesterone [M.P. 133–135° C., prepared by Oppenauer, oxidation of 17α-methylpregnenolone, Guntherd et al., Helv. 35, 2437 (1935)], 200 ml. of ether, 30 ml. of acetic acid and 4 ml. of 17% of hydrogen bromide. After stirring 40 minutes at room temperature the reaction mixture is worked up as described above to give the 2,6-dibromide; M.P. 173–175° C. (dec.).

The purified dibromide is heated at reflux overnight in 50 g. of potassium acetate and 150 ml. of acetone. Working up as described, charcoal treatment and recrystallization from acetone-ether gives 17α-methyl-2,5-pregnadien-3-ol-4,20-dione 3-acetate; M.P. 181–183° C., $$[\alpha]_{CHCl_3}=-5.5$$

E max.=7600 at 246 mμ (methanol).

Example 4

A solution of 1.2 g. of 6α,17α-dimethylprogesterone in ether/acetic acid is brominated as described above to give the 2,6-dibromide. This compound (750 mg.) is heated at reflux with sodium acetate/acetone as described for 7 hours. Working up as described gives 6,17α-dimethyl-2,5-pregnadien-3-ol-4,20-dione 3-acetate.

Example 5

A sample of 2 g. of 17α-acetoxy-2α,6β-dibromo-progesterone is heated at reflux for 10 hours in a mixture of 10 g. of sodium formate and 100 ml. of anhydrous ethanol. Working up as described gives 2,5-pregnadiene-3,17α-diol-4,20-dione,3-formate-17-acetate.

A sample of 1 g. of 17α-acetoxy-6α-methyl-1,6-dibromoprogesterone is heated at reflux for 8 hours with 5 g. of sodium benzoate in 150 ml. of methyl ethyl ketone. Working up as described gives the 3-benzoate-17-acetate ester of 6-methyl-2,5-pregnadien-3,17α-diol-4,20-dione. Using potassium iso-valerate gives the 3-iso-valerate ester.

Example 6

A solution of 750 mg. of 17α-methyl-2,5-pregnadien-3-ol-4,20-dione-3-acetate in methanol is carefully titrated with a slight excess of sodium methoxide at room temperature. After standing for several hours the mixture is made slightly acid with several drops of acetic acid. Evaporation in vacuo and extraction into methylene chloride gives the free 3-hydroxy congener.

What is claimed is:
1. The method of forming a compound of the formula:

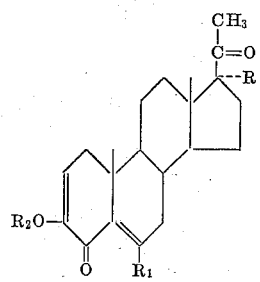

in which:
R is a member selected from the group consisting of methyl and acetoxy;
$R_1$ is a member selected from the group consisting of hydrogen and methyl; and
$R_2$ is acyl derived from a nontoxic, stable and pharmaceutically acceptable carboxylic acid of less than 8 carbon atoms,
comprising brominating with approximately 2 molar equivalents of bromine at from about 0–25° C. a compound of the formula:

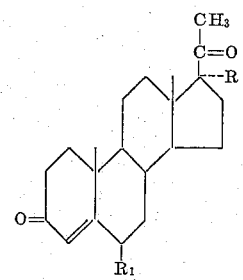

in which R and $R_1$ are as described above to obtain the 2,6-dibromo derivative and reacting said dibromo derivative at reflux with an excess of alkali metal carboxylate derived from the same acid defined in $R_2$ above in a solvent unreactive under the reaction conditions, boiling at less than 120° C. and in which the reactants are substantially soluble.

2. The method of forming a 2,6-dibromo steroid of the formula:

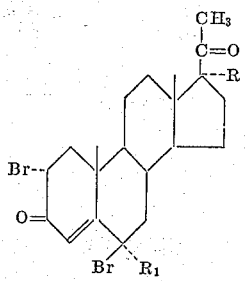

in which:
R is a member selected from the group consisting of methyl and acetoxy; and
$R_1$ is a member selected from the group consisting of methyl and hydrogen,
comprising brominating with approximately two molar equivalents of bromine at from about 0–25° C. a compound of the formula:

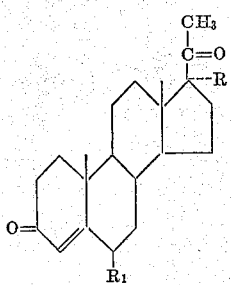

in which R and R₁ are as described.

3. The method of claim 2 characterized that hydrogen bromide is present during the bromination reaction.

4. The method of claim 2 characterized in that R₁ is acetoxy.

5. A compound of the formula:

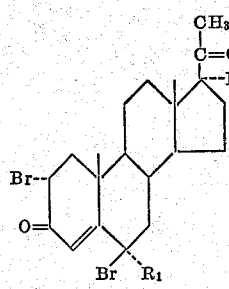

in which:
R is a member selected from the group consisting of methyl and acetoxy; and
R₁ is a member selected from the group consisting of hydrogen and methyl.

6. A compound of the formula:

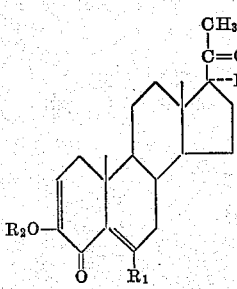

in which:
R is a member selected from the group consisting of acetoxy and methyl;
R₁ is a member selected from the group consisting of methyl and hydrogen; and
R₂ is a member selected from the group consisting of hydrogen and acyl derived from a nontoxic, stable and pharmaceutically acceptable carboxylic acid of less than 8 carbon atoms.

7. A compound of the formula:

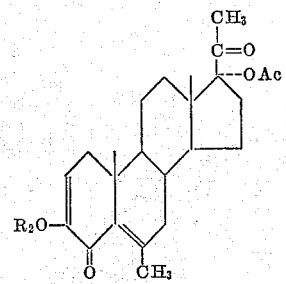

in which:
Ac is acetyl; and
R₂ is acyl derived from a nontoxic, stable and pharmaceutically acceptable carboxylic acid of less than 8 carbon atoms.

8. A compound of the formula:

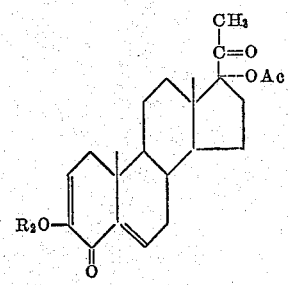

in which:
Ac is acetyl; and
R₂ is acyl derived from a nontoxic, stable and pharmaceutically acceptable carboxylic acid of less than 8 carbon atoms.

9. A compound of the formula:

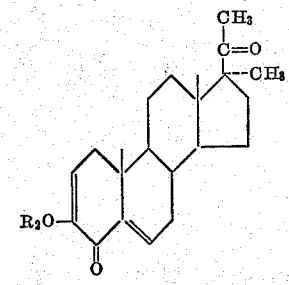

in which R₂ is acyl derived from a nontoxic, stable and pharmaceutically acceptable carboxylic acid of less than 8 carbon atoms.

10. 6 - methyl - 2,5 - pregnadien-3,17α-diol-4,20-dione, 3,17-diacetate.

11. 2,5 - pregnadiene - 3,17α - diol - 4,20 - dione,3,17-diacetate.

12. 17α - methyl - 2,5 - pregnadien - 3 - ol - 4,20-dione,3-acetate.

13. 6,17α - dimethyl - 2,5 - pregnadien - 3 - ol - 4,20-dione-3-acetate.

14. 17α-methyl-2,5-pregnadien-3-ol-4,20-dione.

References Cited in the file of this patent

UNITED STATES PATENTS 2,891,975  Julian et al. _____ June 23, 1959